United States Patent [19]
Li et al.

[11] Patent Number: 5,936,365
[45] Date of Patent: Aug. 10, 1999

[54] METHOD AND APPARATUS FOR USING BACK EMF TO CONTROL A MOTOR

[75] Inventors: Chin Li, Clark, N.J.; Larry B. Li, Irvine, Calif.

[73] Assignee: Texas Instruments Incorporated, Dallas, Tex.

[21] Appl. No.: 09/116,421

[22] Filed: Jul. 15, 1998

[51] Int. Cl.⁶ .................................................. H02P 7/50
[52] U.S. Cl. .............................................................. 318/439
[58] Field of Search ..................... 318/254, 439, 318/449, 495, 496, 498, 798, 799, 800, 808, 811, 823, 832

[56] References Cited

U.S. PATENT DOCUMENTS

5,223,771  6/1993  Chari ........................................ 318/254
5,808,440  9/1998  Bennett et al. ........................... 318/778

*Primary Examiner*—William M. Shoop, Jr.
*Assistant Examiner*—Rina Duda
*Attorney, Agent, or Firm*—W. Daniel Swayze, Jr.; Wade James Brady, III; Richard L. Donaldson

[57] ABSTRACT

A circuit to control a motor having phase inputs. A respective control signal for each phase input of the motor is generated such that each phase input is cyclically driven and undriven. Additionally, changes at each phase input relative to a reference potential are measured, and changes at each phase input during time intervals in which noise is expected are ignored: timing information based on the measured changes at the phase inputs is generated, and timing information to carry out the step of generating a respective control signal is used.

20 Claims, 5 Drawing Sheets

METHOD AND APPARATUS FOR USING BACK EMF TO CONTROL A MOTOR

TECHNICAL FIELD OF THE INVENTION

This invention relates to the field of electronic motor control and, more specifically, to a method and apparatus for using back EMF to control a motor.

BACKGROUND OF THE INVENTION

Magnetic disk devices, such as hard disk drives supporting random access, utilize a spindle that includes a collection of platters. These platters are covered with a magnetic material for recording information. Each platter contains a series of circular recording tracks containing sectors of information that can be read or written to by electromagnetic heads utilizing switchable magnetic fields. The platters of a spindle generally rotate at a constant angular speed when memory sectors are being read or written.

The rotation of a spindle of platters in a hard disk drive is effected by a spindle motor. The motor includes a magnetic rotor rotating in response to an electrical field created by three sets of electric coils. At any given point in time, only two of the three sets of coils are driven. As the rotor magnet sweeps past these coils, it generates on the undriven set of coils a back electromotive force (BEMF) signal which varies in intensity. The strength of the BEMF signal can be utilized by a hard disk drive controller to provide feedback about the speed and state of the spindle motor during operation.

In particular, the BEMF signal can be compared to a voltage at a center tap of the motor, which is a common potential tied to each of the three connected sets of motor coils, in order to adequately gauge the exact moment of commutation. This moment of commutation refers to the exact time when a given electric field produced by a set of coils turns on or off.

A problem arises when attempting to ensure that the spindle motor of a hard disk drive rotates at a constant speed specified by a hard disk drive controller. Previous techniques for ensuring that a spindle motor rotates at a designated constant speed include well known control techniques such as a phase locked loop control system to access and track the BEMF strength or phase. However, the phase locked loop detection technique cannot be easily resynchronized if it falls outside of a certain range of disparity between the intended and actual phase of the BEMF signal. Once the phase falls outside of the set range, the spindle motor must be powered off and/or started again from zero speed in order to resynchronize and accurately track a phase of the BEMF signal provided by the spindle motor. Additionally, the time required to alter the speed of rotation for the motor is high, due to a large capacitance in a low pass filter utilized by the phase locked loop technique. The capacitance in the low pass filter must be maintained at a large magnitude in order to reduce noise that routinely disrupts the circuit's performance.

The rotational speed of a spindle motor in a hard disk drive may change due to physical bumping, jarring, vibrations, the interruption of a power supply, an unclear supply line, or a power supply spike, for example. Thus, it may be seen that a method of synchronizing the speed of a spindle motor with a controller is needed that allows adjustment after a significant disruption, and that enables rapid adjustment of the rotational speed by a hard disk drive controller to ensure that the operation of the spindle motor of a drive meets desired performance criteria.

Another significant source of interference that has the potential to cause disruptions in the constant rotation of a spindle motor is the generation of noise by the spindle motor itself. Such noise can interfere with the ability of BEMF signal strength to accurately reflect the proper timing of applying inputs to a spindle drive motor. In particular, noise is created during the linear operation of a motor just after points of commutation corresponding to time intervals when a phase input to the spindle motor is altered. For a spindle motor operating in pulse width modulation mode, an additional source of noise and rotational disruption is found during time intervals when high frequency switching of a phase input occurs.

SUMMARY OF THE INVENTION

Accordingly, it may be appreciated that a need has arisen for a method and apparatus for an improved BEMF detection technique that substantially eliminates or reduces the above-discussed disadvantages and problems associated with current detection techniques.

In one embodiment of the present invention, an apparatus for controlling a motor having a plurality of phase inputs includes generating a respective control signal for each phase input of the motor such that each phase input is cyclically driven and undriven, measuring changes at each phase input relative to a reference potential, ignoring changes at each phase input during time intervals in which noise is expected, generating timing information based on the measured changes at the phase inputs, and utilizing the timing information to carry out the step of generating a respective control signal.

BRIEF DESCRIPTION OF THE DRAWINGS

A better understanding of the present invention will be realized from the detailed description which follows, taken in conjunction with the accompanying drawings, in which.

DETAILED DESCRIPTION OF THE INVENTION

Figure 1:
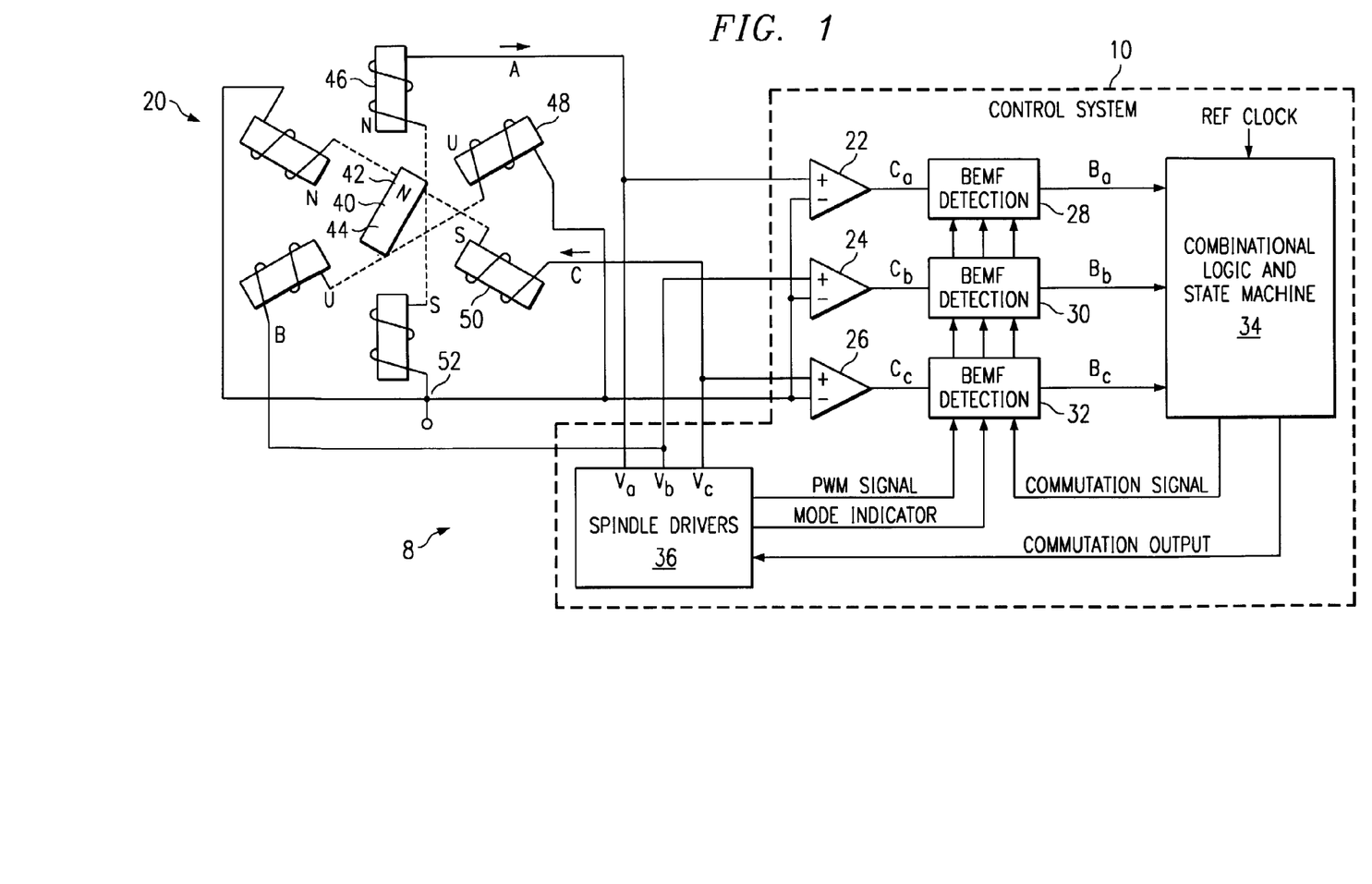
FIG. 1 is a simplified diagram of an apparatus which includes an electrical motor and a control system that controls the motor using the back EMF (BEMF) of the motor, in accord with the present invention.

Referring to FIG. 1, a block diagram is shown of an apparatus 8 which includes a control system 10 for a spindle drive motor 20. Control system 10 includes: comparators 22, 24 and 26; back electromotive force (BEMF) detection devices 28, 30 and 32; a combinational logic and state machine component 34; and a spindle driver device 36. Control system 10 is operable to cause motor 20 to rotate at a desired constant speed assuming that spindle drivers are properly controlled. More specifically, control system 10 provides voltage input signals to the motor 20 that cause rotation at a constant predesignated angular velocity, detects BEMF signals generated by motor 20 in response to such rotation, filters the BEMF signals to discount the effects of noise and interference, and then utilizes the filtered signals to produce the correct commutation signals to ensure that the predesignated velocity is maintained.

As shown in FIG. 1, motor 20 has three phase inputs that are coupled to outputs of spindle driver device 36 and to inputs of comparators 22, 24 and 26. Comparators 22, 24 and 26 have outputs coupled to respective inputs of BEMF detection devices 28, 30 and 32. Each of the BEMF detection devices 28, 30 and 32 has an output coupled to a respective input of combinational logic and state machine component 34. Finally, component 34 has an output coupled to an input of spindle driver device 36. Other components not explicitly shown may include a reference clock, a speed control input device, and a power supply.

Spindle drive motor 20 is well known in the hard disk drive industry, and includes a magnetic rotor 40 having two poles: a north pole 42 and a south pole 44. Rotor 40 is surrounded by three electric coils 46, 48 and 50, each of which is implemented with a pair of coils disposed on diametrically opposite sides of the rotor. Various combinations of voltage signals are applied to coil pairs 46, 48 and 50 by spindle driver device 36 to generate current in the coils. As is generally known, passing current through coil pairs 46, 48 and 50 will create an electromagnetic field operable to cause magnetic rotor 40 to rotate, thereby operating the spindle motor of the hard disk drive. More specifically, applying a specified series of voltage signals to each pair of coils in synchronism with the orientation of rotor 40 causes current to flow through the coils in directions causing rotor 40 to maintain a near constant velocity of angular rotation. For example, the orientation of rotor 40 in FIG. 1 is such that the north pole 42 of rotor 40 is pointing between the north pole of coil pair 46 and undriven coil 48, 30° clockwise from a parallel alignment with coil pair 46. An alignment such as this is hereafter referred to as a point of commutation. The voltages applied in such an example are generated so as to cause the rotor to continue to rotate past coil pair 46 in a clockwise direction. The exact voltage inputs applied are described below in relation to FIGS. 4–6.

Coil pairs 46, 48 and 50 are connected at a common potential known in the industry as a center tap 52. Center tap 52 is generally at a potential which is roughly half the magnitude of the power supply for motor 20. For example, a spindle motor operating off of a 12 volt DC power supply would display a center tap voltage at approximately 6 volts.

During the rotation of rotor 40, at any given time, two of the coil pairs will be "driven" and have current passing through them in response to the voltage inputs applied by spindle driver device 36 to the coils. The remaining coil pair is designated as being undriven, and has no current generated in response to the voltage signals applied. However, as magnetic rotor 40 rotates, an electromotive force is created, causing flux be generated at the undriven coil pair. A resulting potential, the previously identified BEMF signal, can then be measured at the input to that specific undriven coil pair. The strength of this BEMF signal depends on the orientation of the magnetic rotor in relation to coils 46, 48 and 50. As the north pole of the magnetic rotor approaches alignment with the undriven coil pair, the magnitude of the BEMF signal will approach, cross, and begin to move away from the center tap voltage. This process is addressed in further detail and in relation to other control signals in the description accompanying FIGS. 4 through 6.

The BEMF signal, or more precisely the voltage measured at the input to each coil pair 46, 48 and 50 when that pair is undriven, is measured over time by comparators 22, 24 and 26, by comparing the signal to the voltage at center tap 52, which is common to all pairs. Comparators 22, 24 and 26 each generate a digital output known as a comparator output signal, labeled $C_a$, $C_b$ and $C_c$ respectively. The digital output essentially changes values from a low to a high value or from a high to a low value each time the BEMF signal crosses the center tap voltage 52. Thus, a rising or falling edge of a comparator output signal corresponds to the voltage measured at the input of a corresponding coil pair crossing center tap voltage 52 as it increases or decreases in magnitude. The operation of comparators 22, 24 and 26, while generally known in the industry, will be described in more detail later, in association with FIG. 2.

Comparator output signals $C_a$, $C_b$ and $C_c$ are then utilized as input signals for BEMF detection devices 28, 30 and 32. BEMF detection devices 28, 30 and 32 take the center tap crossing points indicated by these comparator output signals, and retain or reject their validity based on the predicted presence of noise and/or interference. More specifically, devices 28, 30 and 32 filter out false center tap crossings caused by the switching of the voltage inputs to spindle drive motor 20. This switching includes both switching of input signals upon commutation of the rotor with a coil pair and the pulsing of inputs associated with the operation of motor 20 in pulse width modulation mode. Other sources of noise or interference that occur outside predicted intervals of true center tap crossings may be rejected using the BEMF detection devices described herein. BEMF detection devices 28, 30 and 32 then generate BEMF detection signals $B_a$, $B_b$ and $B_c$ respectively that are similar to the comparator output signals in that they reflect a rising or falling edge for each true center tap crossings. Any false center tap crossings caused by interference upon commutation or upon input pulsing will have been eliminated from the signal by devices 28, 30 and 32. The operation of devices 28, 30 and 32 will be addressed in more detail below in the description of FIG. 3.

The BEMF detection signals are then translated by combinational logic and state machine component 34, which may include combinational logic currently used in the hard disk drive industry to detect points of commutation based on center tap crossings. However, whereas the combinational logic and state machine components of prior spindle drive motor controllers utilized comparator output signals to identify center tap crossings, the present invention utilizes the filtered true center tap crossings identified by BEMF detection devices 28, 30 and 32, to achieve greater accuracy and efficiency. Component 34 essentially delays a determined period of time after each center tap voltage crossing, and then generates a commutation output to the spindle driver device indicating a predicted point of commutation. In calculating that period of time between crossing and commutation, a reference clock is utilized along with data from the previous state of a state machine within component 34. The state machine includes further data regarding the previous crossing point and point of commutation. Component 34 may utilize additional external controllers to determine the proper period of delay for a particular state.

Spindle driver device 36 utilizes the commutation output signals of component 34 to apply controlled voltage inputs $V_a$, $V_b$ and $V_c$ to coil pairs 46, 48 and 50 respectively. As has already been explained, in order to keep the spindle motor rotating at a constant speed, a hard disk drive controller must be able to detect any legitimate crossings of the center tap voltage value by BEMF signals at inputs to each coil pair of the motor. The spindle driver device then utilizes these cross over points to engage switching mechanisms, whereby the fields created by coils 18, 20 and 22 can be either turned on or off to ensure constant rotation by the magnetic rotor.

Figure 2:
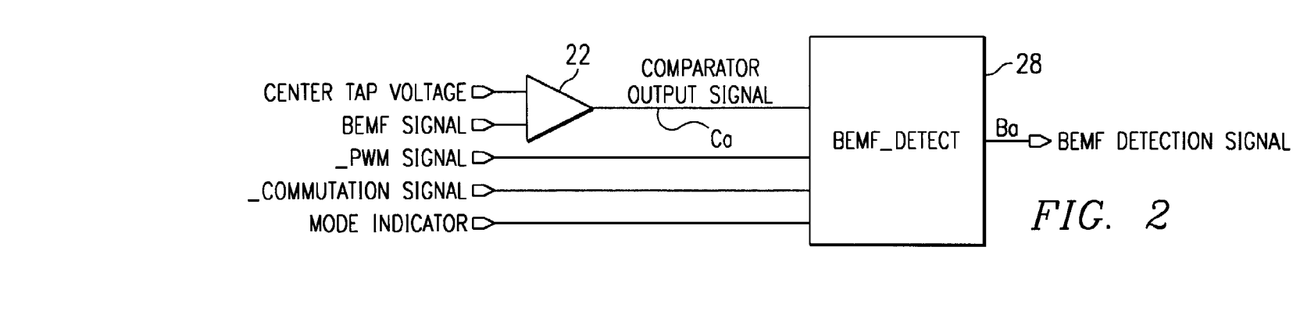
FIG. 2 is a schematic diagram of a comparator and BEMF detection device which are components of the control system of FIG. 1.
Figure 3:
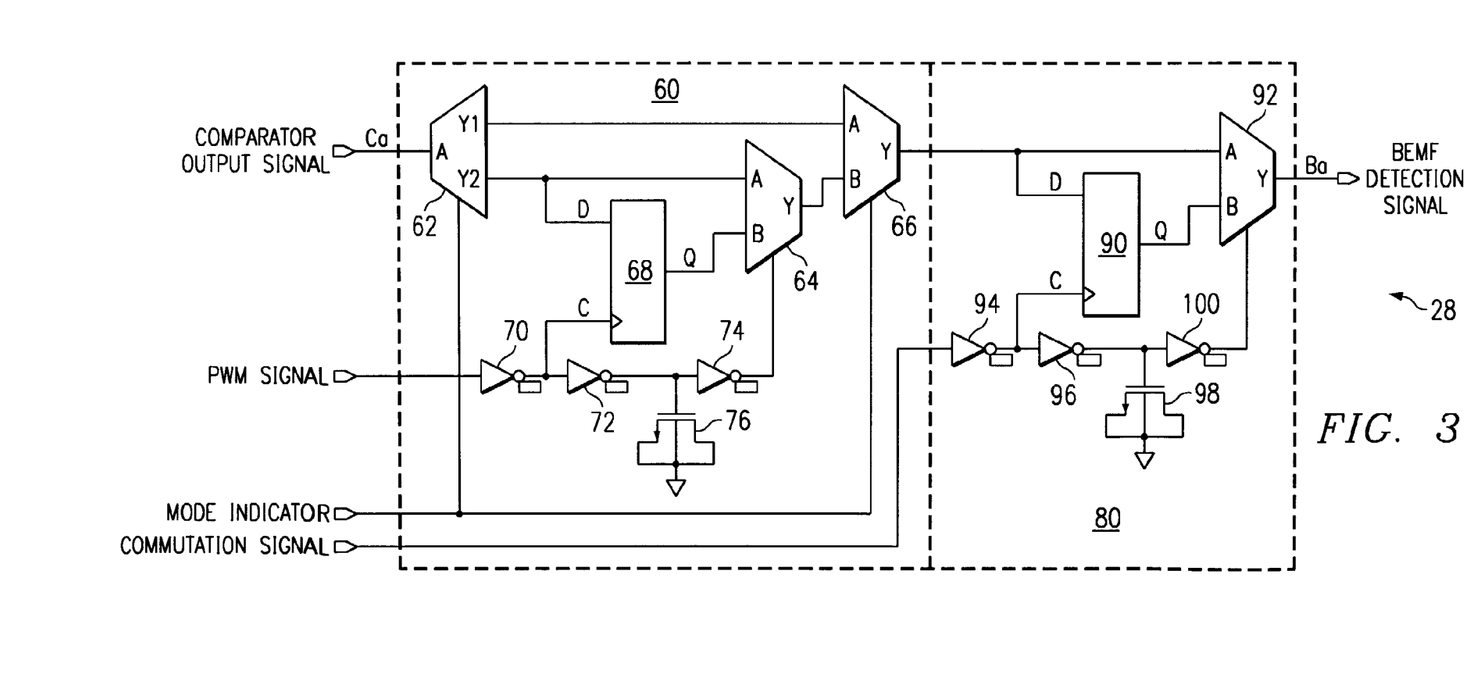
FIG. 3 is a detailed schematic diagram of the BEMF detection device of FIG. 2.

For purposes of brevity and clarity, the description accompanying FIGS. 2 and 3 will be in regards to a single coil pair 46 of spindle drive motor 20 shown in FIG. 1, and its associated comparator 22 and BEMF detection device 28.

Traditionally, as already mentioned, detecting a cross over point is accomplished by the use of comparator 22 as shown in FIG. 2. Comparator 22 includes an amplifier having as inputs the two analog signals from the center tap and the BEMF output, and producing at an output a digital comparator output signal $C_a$ indicating whether or not cross over has occurred. Generally, comparator 22 compares the center tap voltage to the BEMF signal, causing the comparator output signal $C_a$ to go from low to high or from high to low whenever a cross over has occurred.

However, comparator 22 does not have the capability to filter out large sources of noise created during the operation of spindle motor 20. One source of large electric noise occurs immediately after drivers within spindle driver device 36 of FIG. 1 switch on or off voltage inputs to any of electric coil pairs 46, 48 or 50. Noise may be generated as an electrical signal due to inductor kickback after a specific coil has been turned off, for example. This is described in more detail in the description accompanying FIGS. 4–6.

Another source of large noise can be attributed to switching that takes place when spindle motor 20 operates in a pulse width modulation mode. Essentially, during pulse width modulation mode, electric coil pairs 46, 48 and 50 of spindle motor 20, instead of potentially being switched on during an entire period between commutations, will instead be rapidly switched on and off during the same period. This pulse signal closely approximates the signal created by the coil if it were operated in a constant "linear" mode, by averaging over the entire time period between commutations the value of the pulse strength during all of the pulses that take place in one period between commutations. Thus, pulse width modulation mode can closely approximate linear operation while wasting less energy on the driver devices themselves. The switching associated with each of these pulses can again be the source of a large noise signal. Neither of these sources of noise are small enough to be compensated for by a simple comparative circuit like that of comparator 22.

Fortunately, the moments of commutation and the switching times of the PWM mode occur at controlled times. Timing information about these moments can be used to mask out the comparator output when an output is likely to be false, by utilizing BEMF detection device 28, which is also shown in FIG. 2.

BEMF detection device 28 utilizes the comparator output signal to detect true crossing of the center tap voltage based on known sources of noise. BEMF detection device 28 generates a BEMF detection signal $B_a$, indicating when true crossings of the center tap voltage have occurred.

BEMF detection device 28 utilizes four inputs. The first input is the comparator output signal $C_a$ generated by comparator 22, as described above. A second input is an active low PWM signal generated by spindle driver device 36, indicating that a switching moment used to generate a pulse is about to occur. This PWM signal essentially indicates that a comparator output thereafter received by BEMF detection device 28 may be corrupted by PWM switching noise. A third input to the device 28 is an active low commutation signal that is generated by combinational logic and state machine component 34 of FIG. 1 when switching associated with commutation is predicted to occur. This commutation signal becomes active at the point of commutation, and remains active for approximately 15 degrees of the phase of the magnetic rotor, for example. The fourth input to BEMF detection device 28 is a mode indicator that provides BEMF detection device 28 with a current operating mode of the spindle drive motor. The mode indicator indicates to BEMF detection device 28 whether spindle drive motor 20 is operating in the linear mode or in the pulse width modulation mode. BEMF detection device 28 then utilizes that information to decide whether or not the PWM signal should be utilized in determining true crossings of the center tap voltage by the BEMF signal. The four inputs are utilized by BEMF detection device 28 to generate BEMF detection signal $B_a$ for use by the combinational logic and state machine component 34 of FIG. 1.

Referring now to FIG. 3, a more detailed circuit diagram of BEMF detection device 28 is shown. BEMF detection device 28 has the four inputs as previously described in the discussion of FIG. 2. BEMF detection device 28 includes two stages, in particular a pulse stage 60 and a commutation stage 80.

Pulse stage 60 compensates for magnetic switching associated with pulse width modulation mode operation of spindle drive motor 20, by masking the comparator output signal during times associated with probable noise from such switching. FIG. 3 shows that pulse stage 60 includes selection devices 62, 64 and 66, register 68, invertors 70, 72 and 74, and delay element 76.

Selection device 62 of pulse stage 60 utilizes two inputs, which are the comparator output signal and the mode indicator. Device 62 may be a demultiplexer, for example, capable of having its input signal presented at either of two output nodes, dependent on its selection input "sel" that is connected to the mode indicator. If the mode indicator is low, signifying the linear operation mode of the spindle drive motor, selection device 62 will select the Y1 output line on which to send the comparator output signal to selection device 66 as the first input at A. If the mode indicator is high, signifying the pulse width modulation mode of the spindle drive motor 20, device 62 will select the Y2 output line on which to send comparator output signal to register 68 and selection device 64. Specifically, the comparator output signal connects to register 68 as an input at D.

Register 68 may be any register or similar buffering device, such as a latch, for example. Register 68 has two input signals and one output signal. The first input is input D that, as already mentioned, provides an input node for the comparator output signal from selection device 62. The second input to register 68 is a clock signal input C, by which register 68 adjusts its operation. Essentially, register 68 latches in the value of the comparator output signal from input D at output Q each time there is a rising edge of the clock signal at input C.

The clock signal at C is a signal derived from the PWM signal utilized as an input to detection device 28. Specifically, the active low PWM signal passes through an inverter 70 before reaching register 68 at input C. As previously indicated, PWM signal goes low each time a switching moment used to generate a pulse is about to occur. This low signal is then inverted by inverter 70 and supplied to register 74 as a clock signal. As such, the beginning of a pulse is actually seen by register 68 as the rising edge of the clock signal at C. Any time a pulse associated with spindle drive motor 20 is detected, the clock signal at C will switch from low to high, thus displaying a leading edge utilized by register 68 to latch in the comparator output signal input at D to the output at Q.

The output held at Q essentially represents the last reliable comparator output signal generated by comparator 22 that is not corrupted by noise generated during pulse width modulation. The output at Q is in turn coupled to selection device 64 as its second input at B. Detection device 64 has two inputs, namely the unmodified BEMF comparator output signal relayed from selection device 62 at input A, and the last latched signal from register 68 present at output Q at input B.

One of the two inputs to selection device 64 is selected by a control signal present at the selection input "sel", to be presented at output Y of selection device 64. Selection input to selection device 64 is the PWM input signal after being inverted and delayed. More specifically, as seen at the selection input, the PWM signal input to the BEMF detection circuit is first inverted by inverter 70, as previously indicated, and then passes through additional invertors 72 and 74 and their associated delay element 26. The PWM signal, after being inverted by inverter 74, is supplied to selection device 64 as its selection input.

The delay introduced by delay element 76 may be a period of 6 nanoseconds, for example. The delay element 76 is a transistor present between the output of inverter 72 and the input of inverter 74 as shown in FIG. 3. This single transistor has its source, drain and body or bulk tied to ground, while the gate of the transistor is tied to the node existing between invertors 72 and 74. In such a configuration, the transistor 76 functions as a capacitive element that must be charged before the signal at the output of inverter 72 enters as an input to inverter 74.

The delay introduced by delay element 76 ensures a stable output from register 68 at Q, thereby ensuring a smooth transition at output Y of selection device 64. The purpose of this delay is to ensure that the input at D is given time to latch in at output Q of register 68. Delay element 76 specifically prevents the selection input of selection device 64 from switching the value at output Y from the value at input A to the value at input B prior to the time that Q is set to a different value following a rising clock edge. Without the presence of delay element 76, selection device 64 could switch output Y to the input at B, and that input could subsequently change values as the input at D is latched into Q. Such an instability at output Y of selection device 64 could lead to BEMF detection device 28 inaccuracies in masking noise associated with pulse width modulation.

Thus, selection device 64 acts to mirror the comparator output signal during periods of time where no noise associated with pulse width modulation is expected, and acts to reflect the latched value of the comparator output signal at its latest reliable point when noise is expected in association with pulse width modulation.

Coupling the pulse stage 60 to commutation stage 80 is selection device 66. As already mentioned, selection device 66 has as its first input a mirrored comparator output signal routed directly from selection device 62, that avoids all intermediate devices of pulse stage 60. The selection input "sel" for selection device 66 is the mode indicator previously discussed, that designates whether spindle drive motor 20 is operating in linear or pulse width modulation mode. When spindle drive motor 20 is operating in linear mode, selection device 66 simply passes the unmodified input A to output Y, effectively bypassing the entire pulse width modulation stage. However, if the mode indicator indicates that motor 20 is operating in pulse width modulation mode, selection device 66 passes the comparator output signal at input B to output Y to serve as an input to pulse stage 60. In this way, pulse stage 60 is utilized only when spindle drive motor 20 is operating in pulse width modulation mode, thereby filtering out the comparator output signal during predicted periods of probable pulse noise interference.

Commutation stage 80 has as inputs the comparator output signal seen at output Y of the PWM stage, and the active low commutation signal previously discussed. Commutation stage 80 includes a register 90, and selection device 92, as well as a similar inverter and delay element configuration to that seen in pulse stage 60. The inverter and delay element configuration includes invertors 94, 96 and 100 and delay element 98.

The comparator output signal from pulse stage 60 is supplied to both the selection device 92 and register 90. Specifically, the comparator output signal is the first input A of selection device 92. The comparator output signal from pulse stage 60 is also supplied to register 90 at input D.

Register 90 is similar to register 68. Like register 68, register 90 has a clock input at C. The clock input is the active low commutation signal, after it passes through an inverter 94. Thus, similar to the operation of register 68, a falling edge of the commutation signal is reflected with a rising edge of the clock signal utilized by register 90. Specifically, as register 90 sees a rising edge of the clock signal, the comparator output signal present at input D is latched in at output Q of register 90. The commutation signal has a falling edge at a point of commutation of the magnetic rotor 40 and a coil of the spindle drive motor 20. The commutation signal therefore acts to preserve a last reliable comparator output signal at output Q of register 90 immediately prior to periods of time associated with noise or interference caused by commutation. It should be noted that the commutation signal is reset to a high value, and therefore inactive status, by combinational logic and state machine device 34 after a specific phase delay following rotor commutation. For example, as described later, the period of time before the reset may correspond to a rotation of 15° of the magnetic rotor following commutation.

The latched comparator output signal at output Q of register 90 is the second input B of selection device 92. The selection input "sel" of selection device 92 is the commutation signal seen by selection device 92 after passing through the inverter delay configuration previously mentioned. More specifically, after the commutation signal has passed through inverter 94, the commutation signal then passes through inverter 96, and is then delayed by delay element 98. Delay element 98 may, similar to element 96, be a single transistor having its source, drain and body or bulk tied to ground, and its gate tied to the output of inverter 96 and the input of inverter 100. Such a transistor can be selected based on its size and properties to achieve a desired delay. The transistor in FIG. 3, generates a delay of six nanoseconds. As in the previous stage, this delay essentially allows time for the BEMF comparator input at D to latch at output Q of register 90 upon seeing a change in the commutation signal at the clock input.

After experiencing this delay, the commutation signal passes through a final inverter 100 to be seen at the selection input of selection device 92. This selection input will cause output Y to carry the comparator output signal from input A during times when the commutation signal has not indicated that a period of commutation noise or interference is about to occur. However, when the commutation signal has identified such a period, selection device 92 will instead supply to its output the latched value of the comparator output signal from output Q of register 90. The output of selection device 92 is hereafter referred to as a BEMF detection signal and identified in FIG. 1 as $B_a$. Thus, selection device 92 outputs the comparator output signal from pulse stage 60, except for periods of time immediately upon and for a short time after commutation occurs.

Commutation stage 80 therefore filters out noise and interference that is associated with commutation and that may corrupt an accurate BEMF detection signal being utilized by spindle driver device 36 as described in association with FIG. 1.

Figure 4A:
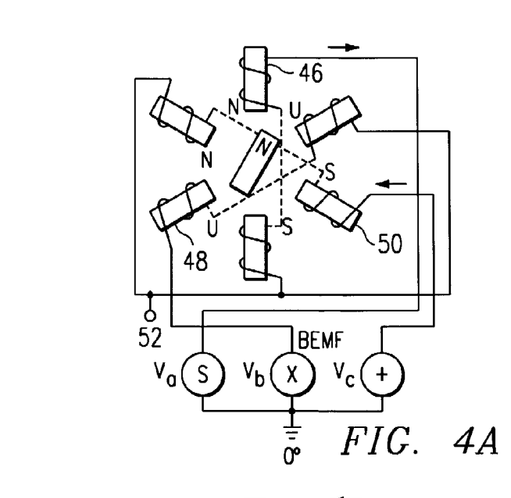
FIGS. 4A through 4F are similar diagrammatic views of the motor of FIG. 1, in different phases of operation.
Figure 4B:
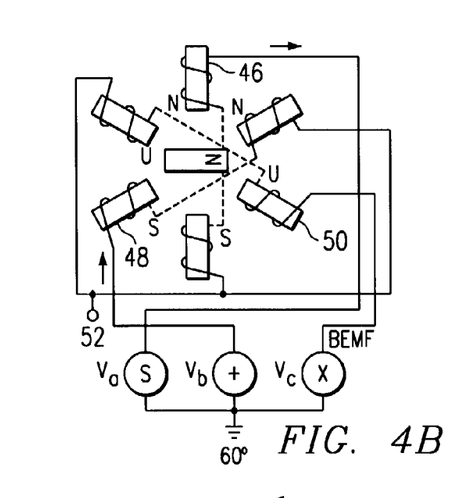
Figure 4C:
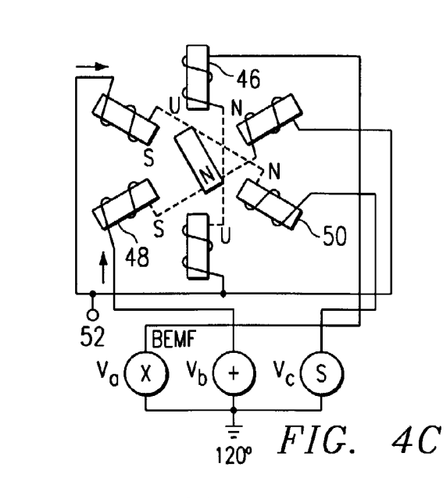
Figure 4D:
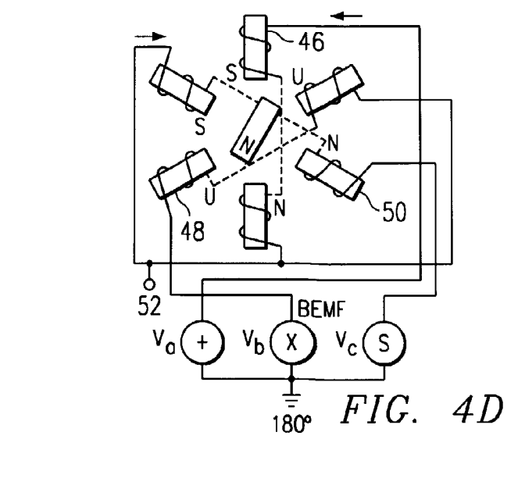
Figure 4E:
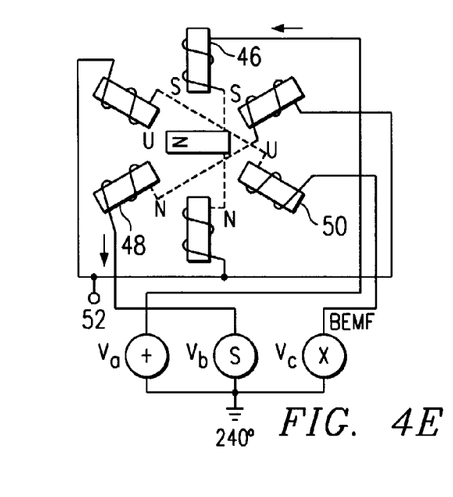
Figure 4F:
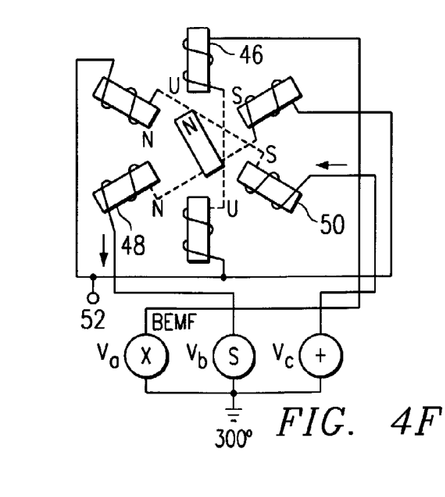

FIGS. 4A to 4F are diagrams showing the phases of operation of spindle drive motor 20 at 60° increments. More specifically, FIG. 4 shows the application of voltage input signals to coil pairs 46, 48 and 50 during the angular movement of magnetic rotor 40. For example, FIG. 4A shows that the voltage input signal applied to coil pair 46 is a short circuited connection to ground, designated at $V_a$ by S. In the same FIGURE, the voltage input supplied to coil pair 48 is an open circuit. The voltage input signal applied to coil pair 50 in FIG. 4A is a positive voltage of 12 volts, for example. With such an application of signals, coil pairs 46 and 50 represent coil pairs driven by the application of the positive input voltage signal at $V_c$. The potential across undriven coil pair 48 can then be measured by comparator 24 to detect the presence of a back electromotive force created by the rotation of magnetic rotor 40 as previously described. FIG. 4 will be described in greater detail in association with the timing diagrams found in FIGS. 5 and 6.

Figure 5:
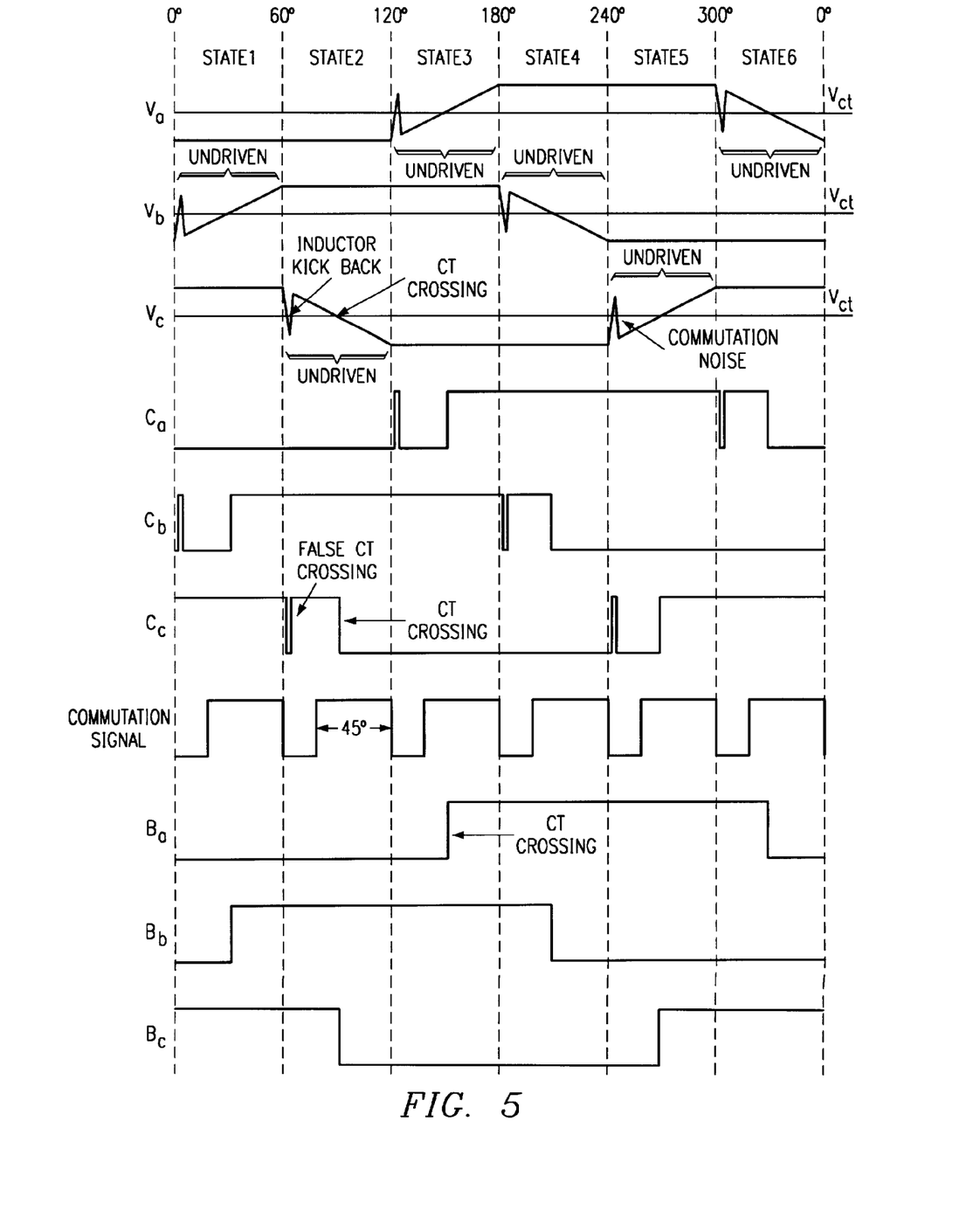
FIG. 5 is a timing diagram illustrating the operation of the apparatus of FIG. 1 in a linear operating mode.

FIG. 5 is a timing diagram summarizing the relationship between the signals identified in FIG. 1 during the linear operation of a spindle drive motor. The timing diagram in effect derives, filters, or otherwise controls the signal detecting back electromotive force of motor 20.

Specifically FIG. 5 first illustrates the values of voltage inputs $V_a$, $V_b$, and $V_c$ as applied to coil pairs 46, 48, and 50 respectively. The timing diagram shows the three signals as they vary relative to the angular position of magnetic rotor 40 of the spindle drive motor 20. More specifically, the timing diagram shows those signals at a continuous spectrum across the angle of rotation and provides references every 60° of that rotation.

The timing diagram begins with the magnetic rotor in a slightly right tilted position as shown in FIG. 4A, corresponding to a 0° angle of rotation. At that angle, the spindle motor driver 36 shown in FIG. 1 is applying a positive voltage to coil pair 50 while effectively short circuiting the input signal to coil pair 46 and causing an open circuit at the input to coil pair 48. Such a configuration of applied input signals causes current to flow from the applied voltage source at $V_c$ through the pair of coils 50. After passing through coil pair 50 the current sees an open circuit at coil 48 and a direct connection to ground through the short circuited path including coil pair 46. The current therefore follows the current path through the pair of coils 46, completing a closed circuit. Current thus flows through coils 46 and 50 in the direction indicated by the arrows in FIG. 4A. The electromotive force generated across coils 46 and 50 causes the angular rotation of magnetic rotor 40 in a clockwise direction. As magnetic rotor 40 rotates, the back electromotive force of motor 20 can be detected at coil 48 and measured as an output relative to the voltage at center tap 52 by comparator 24 associated with coil 48.

As the rotor progresses from 0° to 60°, a positive voltage is applied to the input for coil 48. Initially, as shown in FIG. 5, a voltage spike is seen at $V_b$ as that input signal sees the initially open circuit as a large resistor, corresponding to an equally high voltage. Once the spike has passed, $V_b$ relatively gradually approaches a full strength positive voltage at 60°. As the angle of rotation of magnetic rotor 40 reaches 60°, the voltage input for coil 50 is cut off, creating an open circuit. Initially, a spike drastically decreasing the input signal voltage for coil pair 50 is experienced due to inductor kick-back. Following kick-back, the voltage at 50 gradually decreases as the rotor 40 continues to rotate from 60° to 120°, eventually reaching ground or a low voltage at 120°. Thus, at 60° coil 48 is driven by a positive input voltage, coil 46 effectively sees a short circuit at its input, and coil 50 is effectively an open circuit. Thus similar to current flow at 0°, current at 60° originates at the positive input signal introduced at the input to the coils 48 and follows the current path including coils 46 directly to ground. A back electromotive force is seen at the input to coil C, and is measured relative to the center tap voltage by comparator circuit 26 associated with coil pair 50 as shown in FIG. 1.

The remaining rotation of the rotor from 120° to 360°, or 0°, can readily be understood by looking at FIGS. 4 and 5. It should be noted that a center tap crossing of a BEMF signal occurs during the undriven, or open circuited, phases of each coil pair.

FIG. 5 also illustrates the noise associated with commutation shortly after each 60° increment of angular rotation. Specifically, shortly after 0°, corresponding to magnetic rotor 40 being approximately 30° clockwise relative to coil pair 46, the BEMF signal measured at the input to coil pair 48 may experience noise or disruption associated with switching the input signals to each of the three coil pairs. This may result in the generation of a false center tap crossing indication when comparator 24 compares the potential at coil pair 48 to the center tap voltage such as the crossing shown after 0° by $C_b$. Similar false crossings are illustrated for coil pair 46 at comparator 22 shortly after 120° and 300° as shown by signal $C_a$ in 22 in FIG. 5, and for coil pair 50 at comparator 26 shortly after 60° and 240° as shown by $C_c$ in FIG. 5. An additional false center tap crossing is illustrated by $C_b$ shortly after 180° for coil pair 48.

Similarly, FIG. 5 shows how the implementation of a commutation signal may be utilized by the BEMF detection device illustrated in FIG. 1 to block or screen out these false center tap crossings. More specifically, as shown in FIG. 5, the angular period of rotation between each falling edge of the commutation signal and the subsequent rising edge of the commutation signal identifies a period of angular rotation when a BEMF signal associated with a specific coil may indicate that a false center tap crossing has occurred. Essentially, in the embodiment described by FIG. 5, the falling edge of the commutation signal corresponds approximately with each 60° increment of the magnetic rotor's rotation, with the rising edge occurring approximately 15° after the initial falling edge. Effectively, as rotor 40 lines up to the mid point with each adjacent set of coils of the spindle drive motor, the commutation signal is set until the rotor passes those coils by an angular margin of 15°.

Additionally, FIG. 5 shows the presence of the BEMF detection signals as output from each BEMF detection device as shown in FIG. 1 as $B_a$, $B_b$, and $B_c$ relative to the previously described control signals. Specifically, $B_a$, $B_b$ and $B_c$ of FIG. 5 display rising and falling edges of the BEMF detection devices' output after filtering out of all center tap crossings associated with commutation noise and/or interference occurring during the linear operation of the spindle drive motor. For example, signal $C_a$ shows the presence of six rising and falling edges possibly corresponding to center tap crossings. After the filter effect imposed by BEMF detection device 28, the number of rising and falling edges shown by signal $B_a$ accurately reflects two true center tap crossings of the BEMF signal generated at coil pair 48.

Figure 6:
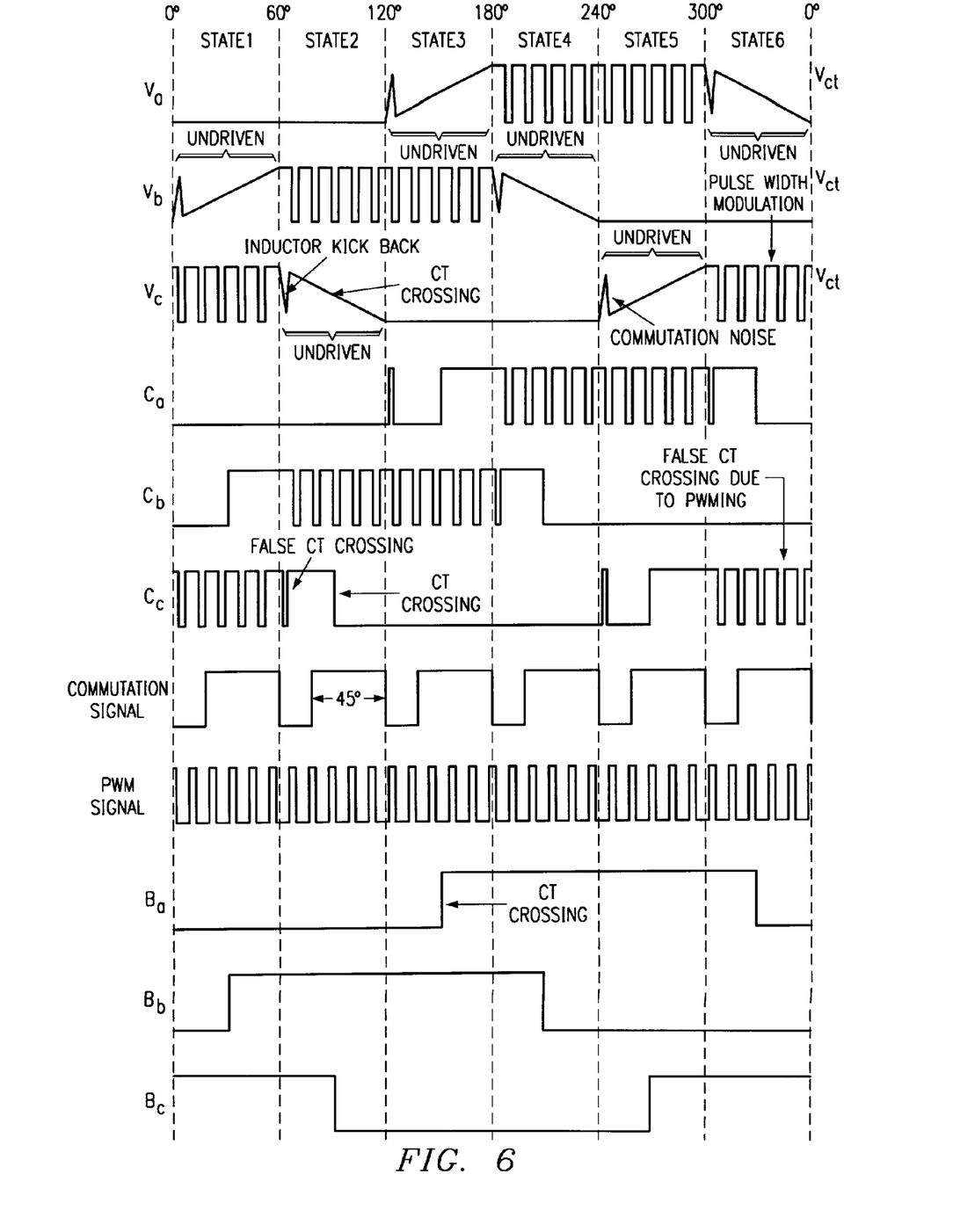
FIG. 6 is a timing diagram illustrating the operation of the apparatus of FIG. 1 in a pulse width modulation operating mode.

FIG. 6, similar to FIG. 5, shows the filtering of noise and interference associated with pulse signals experienced during the operation of spindle drive motor 20 in pulse with modulation mode. FIG. 6 specifically shows the same noise and interference associated with commutation as previously described relative to FIG. 5. In addition, FIG. 6 shows additional noise or interference caused by the rapid switching, or pulsing, of the voltage input signals to each set of coils as the spindle drive motor operates during pulse width modulation. Essentially, whereas during linear operation a voltage input signal to a set of coils may be consistently held to a high voltage for a period of approximately 120°, during pulse width modulation operation that voltage input signal would instead be rapidly pulsed, or switched on and off, at a frequency designed to approximate a constantly held voltage. Such pulse width modulation may maintain the same angular velocity of rotation, while requiring potentially less overall power as previously described.

Obviously, as shown in FIG. 6, during the period of time when a voltage input signal is pulsed there will be center tap crossings of the center tap voltage by the BEMF signals. These crossings are caused by each pulsed input signal, and are crossings that do not correspond to a BEMF signal actually crossing the center tap voltage. FIG. 6 thus shows the presence of a PWM signal similar to the commutation signal, which effectively blocks the reading of a BEMF voltage during periods of time that pulse switching is expected. This blocking is accomplished by the BEMF detection device previously described. Once such interference has been eliminated, as shown in FIG. 6, $B_a$, $B_b$, and $B_c$ then accurately reflect the true number of center tap crossings.

The present invention provides various technical advantages over current detection techniques. For example, one technical advantage is that the improved BEMF detection technique of the current invention allows adjustment and resynchronization of spindle motor speed after a significant disruption or disparity is detected. Another technical advantage is that the present invention allows the adjustment and resynchronization of the spindle motor rotation speed without the significant delay associated with current detection techniques. Another technical advantage is that hard disk drive technology utilizing the current invention will not need to power off a hard disk drive when a significant disparity between the actual spindle motor rotation speed and intended speed is detected. Additionally, the invention provides for a system and method of maintaining the rotation speed of a spindle motor that is not significantly vulnerable to electrical sources of noise or physical interference.

It will be understood by one possessing ordinary skill in the art that the specific selection of device components and connections described throughout this specification does not in any way limit the scope of this invention. For example, other configurations or components could be utilized which effectively block the detection of false center tap crossings by tracking the occurrence of interference associated with commutation and pulse width modulation without departing from the scope of the present invention. In addition, other sources of noise and/or electrical interference may be similarly eliminated through the utilization of the techniques disclosed herein without departing from the scope of this invention. Thus, although one embodiment has been described in detail, it should be understood that various and numerous changes, substitutions, and alterations can be made therein without departing from the scope of the present invention. Other examples of changes, substitutions, and alterations are readily ascertainable by one skilled in the art and could be made without departing from the spirit and scope of the present invention as defined by the following claims.

What is claimed is:

1. An apparatus for controlling a motor having a plurality of phase inputs, comprising:
    a drive circuit that has a plurality of phase outputs and that is operative to control each of said phase outputs according to a predetermined sequence of driven and undriven states; and
    a control circuit operative to provide timing information to said drive circuit in response to a signal at each phase output, said control circuit being operative to be non-responsive to the signal at each said phase output during predetermined time intervals of the predetermined sequence.

2. The apparatus of claim 1, wherein each said phase output is cyclically driven and undriven during respective successive first and second time intervals, the second time interval for each said phase output being offset in time from the second time interval for each of the other phase outputs.

3. The apparatus of claim 1, wherein each said phase output is cyclically driven and undriven during respective successive first and second time intervals, the second time interval for each said phase output being offset in time from the second time interval for each of the other phase outputs, said control circuit being nonresponsive to each of said phase output of said drive circuit during a predetermined portion of the first time interval of that particular phase output.

4. The apparatus of claim 1, wherein each said phase output is cyclically driven and undriven during respective successive first and second time intervals, the second time interval for each said phase output being offset in time from the second time interval for each of the other phase outputs, said control circuit ignoring each said phase output of said drive circuit during a predetermined portion of the second time interval of that particular phase output.

5. The apparatus of claim 1, wherein said control circuit ignores each said phase output during predetermined time intervals when noise is expected at that particular phase output.

6. The apparatus of claim 1, wherein said control circuit comprises a plurality of comparators, each comparator coupled to one of the phase outputs, each comparator being operable to compare the signal at the phase output to a reference potential, each comparator being further operable to generate a respective comparator output signal, each comparator being further operable to modify the respective comparator output signal in response to comparing the signal at the phase output to the reference potential.

7. The apparatus of claim 1, wherein said control circuit comprises a plurality of comparators, each comparator coupled to one of the phase outputs, each comparator being operable to compare the signal at the phase output to a reference potential, each comparator being further operable to generate a respective comparator output signal, each comparator being further operable to modify the respective comparator output signal in response to comparing the signal at the phase output to the reference potential; and wherein said control circuit further comprises a detection circuit that is operative to latch the comparator output signal of one of the comparators during time intervals when interference is expected that is associated with the phase output coupled to that comparator.

8. The apparatus of claim 1, wherein said control circuit comprises a plurality of comparators, each comparator coupled to one of the phase outputs, each comparator being operable to compare the signal at the phase output to a reference potential, each comparator being further operable to generate a respective comparator output signal, each comparator being further operable to modify the respective comparator output signal in response to comparing the signal at the phase output to the reference potential; and wherein said control circuit further comprises a detection circuit that is operative to generate a detection signal in response to each of the comparator output signals, each detection signal ignoring changes to the comparator output signal that the detection signal responds to during time intervals when noise is expected, the timing information generated by the control circuit in response to the detection signals.

9. A method of controlling a motor having a plurality of phase inputs, comprising:

generating a respective control signal for each phase input of the motor such that each phase input is cyclically driven and undriven;

measuring changes at each phase input relative to a reference potential;

being nonresponsive to changes at each phase input during time intervals in which noise is expected;

generating timing information based on the measaured changes at the phase inputs; and utilizing the timing information to carry out said step of generating a respective control signal.

10. The method of claim 9, wherein said step of measuring changes at each phase input includes modifying a comparator output signal each time the potential at a phase input equals the reference potential.

11. The method of claim 9, wherein said step of not responding to changes at each phase input includes identifying predetermined time intervals where noise associated with the switching of phase inputs is expected.

12. The method of claim 9, wherein said step of measuring changes at each phase input includes modifying a comparator output signal each time the potential at a phase input equals the reference potential; and wherein said step of not responding to changes at each phase input includes ignoring modifications to the comparator output signal during time intervals when noise is expected.

13. The method of claim 9, wherein said step of measuring changes at each phase output includes modifying a comparator output signal each time the potential at a phase input equals the reference potential; and wherein said step of not responding to changes at each phase input includes latching the comparator output signal during time intervals in which change to the comparator output signal is expected as a result of noise.

14. The method of claim 9, wherein said step of not responding to changes at each phase input includes identifying time intervals in which noise is expected due to commutation of the phase inputs.

15. The method of claim 9, wherein said step of not responding to changes at each phase input includes identifying time intervals in which noise is expected due to pulse width modulation of the phase inputs.

16. A motor control system comprising:

a spindle drive motor having a plurality of coils;

a driver coupled to said spindle drive motor, said driver being operable to apply phase input signals to said coils of said spindle drive motor, the phase input signals being operable to cause each said coil to be cyclically in driven and undriven states; and a control circuit coupled to said spindle drive motor and said driver, said control circuit being operable to measure a change in electric potential at each said coil relative to a reference potential, said control circuit being further operable to not respond to the change in electric potential during predetermined time intervals in which noise is expected, said control circuit being operative to send timing information to the driver based on the measured changes in electric potential.

17. The motor control system of claim 16, wherein said control circuit comprises a comparator that is operative to modify a comparator output signal each time the electric potential equals the common potential.

18. The motor control system of claim 16, wherein said control circuit comprises a logic component that is operative to generate an interference indicator during predetermined time intervals where noise associated with switching of the phase inputs is predicted.

19. The motor control system of claim 16, wherein said control circuit comprises a comparator that is operative to modify a comparator output signal each time the electric potential equals the common potential;

wherein said control circuit further comprises a logic component that is operative to generate an interference indicator during predetermined time intervals where noise associated with switching of the phase inputs is predicted; and wherein said control circuit further comprises a detection circuit that is operative to generate a detection signal in response to the comparator output signal, the detection circuit being further operable to ignore modifications to the comparator output signal in response to the interference indicator, the timing information being generated by the logic component in response to the detection signal.

20. The motor control system of claim 16, wherein the timing information is utilized by said driver to control the application of the phase inputs.

\* \* \* \* \*